(12) United States Patent
Cohen et al.

(10) Patent No.: US 6,418,432 B1
(45) Date of Patent: Jul. 9, 2002

(54) SYSTEM AND METHOD FOR FINDING INFORMATION IN A DISTRIBUTED INFORMATION SYSTEM USING QUERY LEARNING AND META SEARCH

(75) Inventors: William W Cohen, North Plainfield; Yoram Singer, New Providence, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/117,312

(22) PCT Filed: Apr. 9, 1997

(86) PCT No.: PCT/US97/05355
§ 371 (c)(1),
(2), (4) Date: Jul. 24, 1998

(87) PCT Pub. No.: WO97/38377
PCT Pub. Date: Oct. 16, 1997

Related U.S. Application Data

(60) Provisional application No. 60/015,231, filed on Apr. 10, 1996.

(51) Int. Cl.[7] .............................................. G06F 17/30
(52) U.S. Cl. ......................................................... 707/5
(58) Field of Search ............................................ 707/5

(56) References Cited

U.S. PATENT DOCUMENTS

| 5,278,980 | A | * | 1/1994 | Pedersen et al. ................ 707/4 |
| 5,488,725 | A | * | 1/1996 | Turtle et al. .................... 707/5 |
| 5,491,820 | A | * | 2/1996 | Belove et al. .................. 707/3 |
| 5,530,852 | A | | 6/1996 | Meske, Jr. et al. |
| 5,572,643 | A | | 11/1996 | Judson |
| 5,623,652 | A | | 4/1997 | Vora et al. |
| 5,717,914 | A | * | 2/1998 | Husick et al. .................. 707/5 |
| 5,768,578 | A | * | 6/1998 | Kirk et al. .................... 707/100 |
| 5,867,799 | A | * | 2/1999 | Lang et al. ..................... 707/1 |
| 6,081,750 | A | * | 6/2000 | Hoffberg et al. .............. 700/17 |

OTHER PUBLICATIONS

J. Kunze, IS&T UC Berkley, Feb. 1995, "Functional Recommandations for Internet Locators", pp. 1–10.
K. Sollins, MIT/LCS—L. Masinter, Xerox Corporation, Dec. 1994, "Functional Requirements for Uniform Resource Names", pp. 1–7.

(List continued on next page.)

*Primary Examiner*—Wayne Amsbury
(74) *Attorney, Agent, or Firm*—Joseph C. Redmond, Jr.; Morgan & Finnegan, LLP

(57) ABSTRACT

An information retrieval system finds information in a Distributed Information System (DIS), e.g. the Internet using query learning and meta search for adding documents to resource directories contained in the DIS. A selection means generates training data characterized as positive and negative examples of a particular class of data residing in the DIS. A learning means generates from the training data at least one query that can be submitted to any one of a plurality of search engines for searching the DIS to find "new" items of the particular class. An evaluation means determines and verifies that the new item(s) is a new subset of the particular class and adds or updates the particular class in the resource directory.

33 Claims, 9 Drawing Sheets

```
PROGRAM BATCH-QUERY-LEARNER (POSITIVE-URLS,SEARCH ENGINE)
    POSSAMPLE := {(d, +): URL(d) ∈ POSITIVE-URLS}
    NEGSAMPLE:= {(d, -):d WAS "RECENTLY ACCESSED"
    AND d ∉ POSITIVE-URLS}
    SAMPLE := POSSAMPLE U NEGSAMPLE
    REPEAT
        RULESET := CALL LEARN (SAMPLE)
        FOR EACH r ∈ RULESET do
            q := CALL CORRESPONDING QUERY (r, SEARCH
            ENGINE)
            RESPONSE := CALL TOP-k-DOCUMENTS (q,SEARCH ENGINE)
            FOR EACH DOCUMENT d ∈ (RESPONSE -
            POSITIVE-URLS) do SAMPLE :=SAMPLE
            U(d, -)
        ENDFOR
        IF NO NEW DOCUMENTS COLLECTED THEN ADJUST
        PARAMETERS OF LEARN

ELSE RESET PARAMETERS OF LEARN TO DEFAULT
        VALUES

UNTIL SOME RESOURCE LIMIT EXCEEDED (SEE TEXT);
END
```

OTHER PUBLICATIONS

T. Beners–Lee, Cern, Jun. 1994, "Universal Resource Indentifiers in WWW", pp. 1–25.

R. Fielding, UC Irving, Jun. 1995, Relative Uniform Resource Locators, pp. 1–16.

M. Orton Et Al, AT&T Bell Laboratories, –Dec.m 1987, "Standard for Interchange of USENET Messages", pp. 1–19.

T. Berners Et Al, Xerox Corporation, Dec. 1994, Uniform Resource Locators (URL), pp. 1–25.

Donald H. Jones, IEEE Expert Magazine, Dec. 1995, "A Model for Commerce On The World Wide Web", pp. 54–59.

Armstrong, D. Frietag, T. Joachims, and T.M. Mitchell. WebWatcher: a learning apprentice for the world wide web. In Proceedings of the 1995 AAAI Spring Symposium on Information Gathering from Heterogeneous, Distributed Environments. Stanford, CA, 1995. AAAI Press.

Avrim Blum. Learning boolean functions in a infinite attribute space. In $22^{bn}$ Annual Symposium on the Theory of Computinf. ACM Press, 1990.

(Avrim Blum. Empirical support for WINNOW and weighted majority alogrithms: results on a calendar scheduling domain. In Machine Learning: Proceedingd of the Twelfth International Conference, Lake Taho, California, 1995. Morgan Kaufmann.

Nicolò Cesa–Bianchi, Yoav Freund, David P. Helmbold, David Haussler, Robert E. Schapire, and Manfred K. Warmuth. How to use expert advice. In Proceedings of the Twenty–Fifth annual ACM Symposium on the Theory of Computing, pp. 382–391, May 1993. Submitted to the Journal of the ACM.

William W. Cohen. Fast effective rule induction. In Machine Learning: Proceedings of the Twelfth International Conference, Lake Taho, California, 1995. Morgan Kaufmann.

William W. Cohen. Learning to claddify English text with ILP methods. In Luc De Raedt, editor, Advances in ILP. IOS Press, 1995.

William W. Cohen. Text categorization and relational learning. In Machine Learning: Proceedings of the Tewlfth International Conference, Lake Taho, California, 1995. Morgan Kaufmann.

William W. Cohen. Learning with set–valued features. In Proceedings of the Thirteenth National Conference on Artificial Intelligence, Portland Oregon, 1996.

Ido Dagan and Shaun Engelson. Committee–based sampling for training probabilistuc classifiers. In Machine Learning: Proceedingd of the Twelfth *International Conference*, Lake Taho, California, 1995. Morgan Kauffman.

Yoav Freund and Robert E. Schapire. A decision–theoretic generalization of on–line learning and an application to boosting. In Proceedings of the Second European Conference on Computational Learning Theory, pp. 23–27. Springer–Verlag, 1995.

Donna Harman. overview of the second text retrieval conference (TREC–2). Information Processing and management, 3:271–289, 1995.

Robert Holte, Laine Acker, and Bruce Porter. Concept learning and the problem of small disjuncts. In Proceedings of the Eleventh Inbternational Joint Conference on Artificial Intelligence, Detroit, Michigan, 1989. Morgan Kauffman.

David Lewis and Jason Catlett. Heterogeneous uncertainty sampling for supervised learning. In *Machine Learning: Proceedings of the Eleventh Annual Conference*, New Brunswick, New Jersey, 1994. Morgan Kauffman.

David Lewis and William Gale. Training text classifiers by uncertainty sampling In *Seventeenth Annual International ACM SIGIR Conference on Researchedand Development in Information Retrieval*, 1994.

David Lewis. Representationa and Learning in information retrieval. Technical Report 91–93, Computer Science Dept., University of Massachusetts at Amherst, 1992, PhD Thesis.

Nick Littlestone and Mafred Warmuth. The weighted majority algorithm. *information and Computation*, 108(2):212–261, 1994.

(Littlestone, 1988) Nick Littlestone. Learning quickly when irrelevant attributes abound:A new linear–thershold algorithm. *Machine Learning*, 2(4), 1988.

J. Ross Quinlan. Learning logical definitions from relations. *machine Learning*, 5(3), 1990.

(Quinlan, 1990) J. Ross Quinlan. C4,5: *programs for machine learning*. Morgan Kaufmann, 1994.

H.S. Seung, M. Opper. and H. Sompolinsky. Query by committe. In *Proceedings of the* Fifth Workshop on Computational *Learning Theory*, pp. 287–294, San Mateo, CA, 1992. Morgan Kaufmann.

V. Vovk. Aggregating strategies. In *Proceedings of the* Third *Annual Workshop on* Computational Learning Theory, pp. 371–383. Morgan Kaufmann, 1990.

Eddings, Joshua, 637 How the Intenet works:, Ziff Davis, 1994 (spec. pg. 5).

http://www.aic.nrl.navy.mil/~aha/research/machine–learning.html.

International Search Report (Jun. 20, 1997).

Y. Freund, H.S. Deung E. Shimar, and N, Tishby. Information, prediction, and query by committe. In Advances in Neurl Informations Processing Systems 5, pp. 483–490, San Mateo, CA, 1992. Morgan Kaufmann.

* cited by examiner

```
PROGRAM BATCH-QUERY-LEARNER (POSITIVE-URLS,SEARCH ENGINE)
    POSSAMPLE := {(d, +): URL(d) ∈ POSITIVE-URLS}
    NEGSAMPLE:= {(d, -):d WAS "RECENTLY ACCESSED"
    AND d ∉ POSITIVE-URLS}
    SAMPLE := POSSAMPLE ∪ NEGSAMPLE
    REPEAT
        RULESET := CALL LEARN (SAMPLE)
        FOR EACH r ∈ RULESET do
            q := CALL CORRESPONDING QUERY (r, SEARCH
            ENGINE)
            RESPONSE := CALL TOP-k-DOCUMENTS (q,SEARCH ENGINE)
            FOR EACH DOCUMENT d ∈ (RESPONSE -
            POSITIVE-URLS) do SAMPLE :=SAMPLE
            ∪(d, -)
        ENDFOR
        IF NO NEW DOCUMENTS COLLECTED THEN ADJUST
        PARAMETERS OF LEARN

ELSE RESET PARAMETERS OF LEARN TO DEFAULT
        VALUES

UNTIL SOME RESOURCE LIMIT EXCEEDED (SEE TEXT);
END
```

FIG.2

PARAMETERS: $\beta \in [0, 1]$, NUMBER OF EXAMPLES T
INITIALIZE: POOL $\leftarrow \phi$
DO FOR $t = 1, 2, \ldots, T$ 1. RECEIVE A SET OF ACTIVE EXPERTS $W_t$ AND THEIR PREDICTIONS $\{y_i^t \mid i \in W_t\}$.

2. INITIALIZE: $\forall i \in W_t \wedge i \notin POOL : p_i^t = 1$.

3. DEFINE A DISTRIBUTION FOR THE SET OF ACTIVE EXPERTS:
$$\forall i \in W_t, \hat{p}_i^t = \frac{p_i^t}{\sum_{j \in W_t} p_j^t}$$

4. PREDICT $F_\beta (\sum_{i \in W_t} \hat{p}_i^t y_i^t)$.

5. COMPUTE LOSS VALUES $\{l_i^t \in [0,1] \, i \in W_t\}$ BASED ON $y_i^t$ AND TRUE CLASS.

6. UPDATE WEIGHTS: $p_i^{t+1} = p_i^t U_\beta(l_i^t)$.

7. RENORMALIZE WEIGHTS: $p_i^{t+1} = p_i^{t+1} \dfrac{\sum_{i \in W_t} p_i^t}{\sum_{i \in W_t} p_i^{t+1}}$ 8. UPDATE: $POOL \leftarrow POOL \cup W_t$.

FIG.5

| PROBLEM | INITIAL | | FINAL SIZE | # INTERACTIONS | | # DOCUMENTS LABELED |
|---|---|---|---|---|---|---|
| | SIZE | PRECISION | | LEARN | SEARCH | |
| ML COURSES | 11 | 0.24 | 46 | 5 | 4 | 82 |
| AI SOCIETIES | 8 | 0.16 | 51 | 5 | 5 | 81 |
| JOGGING STROLLERS | 5 | 0.25 | 20 | 4 | 6 | 24 |

FIG.6

| PROBLEM | # ITERATIONS ALLOWED | # DOCUMENTS PER QUERY (k) | # DOCUMENTS COLLECTED |
|---|---|---|---|
| ML COURSE | 10 | 30 | 199 |
| AI SOCIETIES | 20 | 30 | 126 |
| JOGGING STROLLERS | 10 | 30 | 29 |

FIG.7

|  | RIPPER | | | SLEEPING EXPERTS | | |
|---|---|---|---|---|---|---|
| PROBLEM | %ERROR | RECALL | PRECISION | %ERROR | RECALL | PRECISION |
| ML COURSES | 9.37 | 0.98 | 0.92 | 9.27 | 0.96 | 0.94 |
| AI SOCIETIES | 4.89 | 0.99 | 0.95 | 4.17 | 1.00 | 0.95 |
| JOGGING STROLLERS | 1.36 | 1.00 | 0.99 | 1.59 | 1.00 | 0.98 |

FIG.9

SYSTEM AND METHOD FOR FINDING INFORMATION IN A DISTRIBUTED INFORMATION SYSTEM USING QUERY LEARNING AND META SEARCH

RELATED APPLICATION

Provisional Application, Ser. No. 60/015,231, filed Apr. 10, 1996 and assigned to the same assignee as that of the present invention.

APPENDIX ON CD-ROM

Appendix 3 to this Specification is a computer program listing appendix, submitted on a CD and incorporated by reference in its entirety.

Notice

This document discloses source code for implementing the invention. No license is granted directly, indirectly or by implication to the source code for any purpose by disclosure in this document except copying for informational purposes only or as authorized in writing by the assignee under suitable terms and conditions.

Appendix on CD-ROM

Appendix 3 to this Specification is a computer program listing appendix, submitted on a CD and incorporated by reference in its entirety.

BACKGROUND OF THE INVENTION (1) Field of the Invention

This invention relates to information retrieval systems. More particularly, the invention relates to information retrieval in distributed information system, e.g Internet using query learning and meta search.

(2) Description of the Prior Art

The World Wide Web (WWW) is currently filled with documents that collect together links to all known documents on a topic; henceforth, we will refer to documents of this sort as resource directories. While resource directories are often valuable, they can be difficult to create and maintain. Maintenance is especially problematic because the rapid growth in on-line documents makes it difficult to keep a resource directory up-to-date.

This invention proposes to describe machine learning methods to address the resource directory maintenance problem. In particular, we propose to treat a resource directory as an extensional definition of an unknown concept i.e. documents pointed to by the resource list will be considered positive examples of the unknown concept, and all other documents will be considered negative examples of the concept. Machine learning methods can then be used to construct from these examples an intensional definition of the concept. If an appropriate learning method is used, this definition can be translated into a query for a WWW search engine, such as Altavista, Infoseek or Lycos. If the query is accurate, then re-submitting the query at a later date will detect any new instances of the concept that have been added. We will present experimental results on this problem with two implemented systems. One is an interactive system an augmented WWW browser that allows the user label any document, and to learn a search query from previously labeled examples. This system is useful in locating documents similar to those in a resource directory, thus making it more comprehensive. The other is a batch system which repeatedly learns queries from examples, and then collects and labels pages using these queries. In labeling examples, this system assumes that the original resource directory is complete, and hence can only be used with a nearly exhaustive initial resource directory; however, it can operate without human intervention.

Prior art related to machine learning methods includes the following:

U.S. Pat. No. 5,278,980 issued Jan. 11, 1994 discloses an information retrieval system and method in which an operator inputs one or more query words which are used to determine a search key for searching through a corpus of a document, and which returns any matches between the search key and the corpus of a documents as a phrase containing the word data matching the query word(s), a non-stop (content) word next adjacent to the matching work data, and all intervening stop—words between the matching word data and the next adjacent non-stop word. The operator, after reviewing one or more of the returned phrases can then use one or more of the next adjacent non-stop words as new query words to reformulate the search key and perform a subsequent search through the document corpus. This process can be conducted iteratively, until the appropriate documents of interest are located. The additional non-stop words for each phrase are preferably aligned with each other (e.g., columination) to ease viewing of the "new" content words.

Other prior art related to machine learning methods is disclosed in the references attached to the specification as Appendix 1.

None of the prior art discloses a system and method of adding documents to a resource directory in a distributed information system by using a learning means to generate from training data a plurality of items as positive and/or negatives examples of a particular class and using a learning means to generate at least one query that can be submitted to any of a plurality of methods for searching the system for a new item, after which the new item is evaluated by learning means with the aim of verifying that the new item is a new subset of the class.

SUMMARY OF THE INVENTION

An information retrieval system finds information in a Distributed Information System (DIS), e.g. the Internet using query learning and meta search for adding documents to resource directories contained in the DIS. A selection means generates training data characterized as positive and negative examples of a particular class of data residing in the DIS. A learning means generates from the training data at least one query that can be submitted to any one of a plurality of search engines for searching the DIS to find "new" items of the particular class. An evaluation means determines and verifies that the new item(s) is a new subset of the particular class and adds or updates the particular class in the resource directory.

DESCRIPTION OF THE DRAWING

FIG. 2 is a listing of pseudo code for a batch-query —learner incorporating the principles of the present invention in the system of FIG. 1.

FIG. 5 is a listing of pseudo code for an on line prediction algorithm incorporating the principles of the present invention.

FIG. 6 is a Table summarizing experiments with the learning system of FIG. 3.

FIG. 7 is a Table summarizing experiments with the learning system of FIG. 2.

FIGS. 8 8A, 8B, 8C and 8D are graphs of data showing the results of precision—recall tradeoff for the three problems studied the batch query learning system of FIG. 2.

FIG. 9 is a Table of results of a generalization error study for the learning systems of FIG. 2 and FIG. 5.

DESCRIPTION OF PREFERRED EMBODIMENTS

The problem addressed by the present invention is a variant of the problem of relevance feedback, which is well—studied in information retrieval. One novel aspect of the present invention (other than the WWW-based setting) is that we will focus, as much as is practical, on learning methods that are independent of the search engine used to answer a query. This emphasis seems natural in a WWW setting, as there are currently a number of general—purpose WWW search engines, all under constant development, none clearly superior to the others, and none directly supporting relevance feedback (at the time of this application); hence it seems inappropriate to rely too heavily on a single search engine. The current implementation can use any of several search engines. A second motivation for investigating search engine independent learning methods is that there are many search engines accessible from the WWW that index databases partially or entirely separate from the WWW. As WWW browsers and the Common Gateway Interface (CGI) now provide a nearly uniform interface to many search engines, it seems reasonable to consider the problem of designing general—purpose relevance feedback mechanisms that require few assumptions to be made about the search engine.

Figure 1:
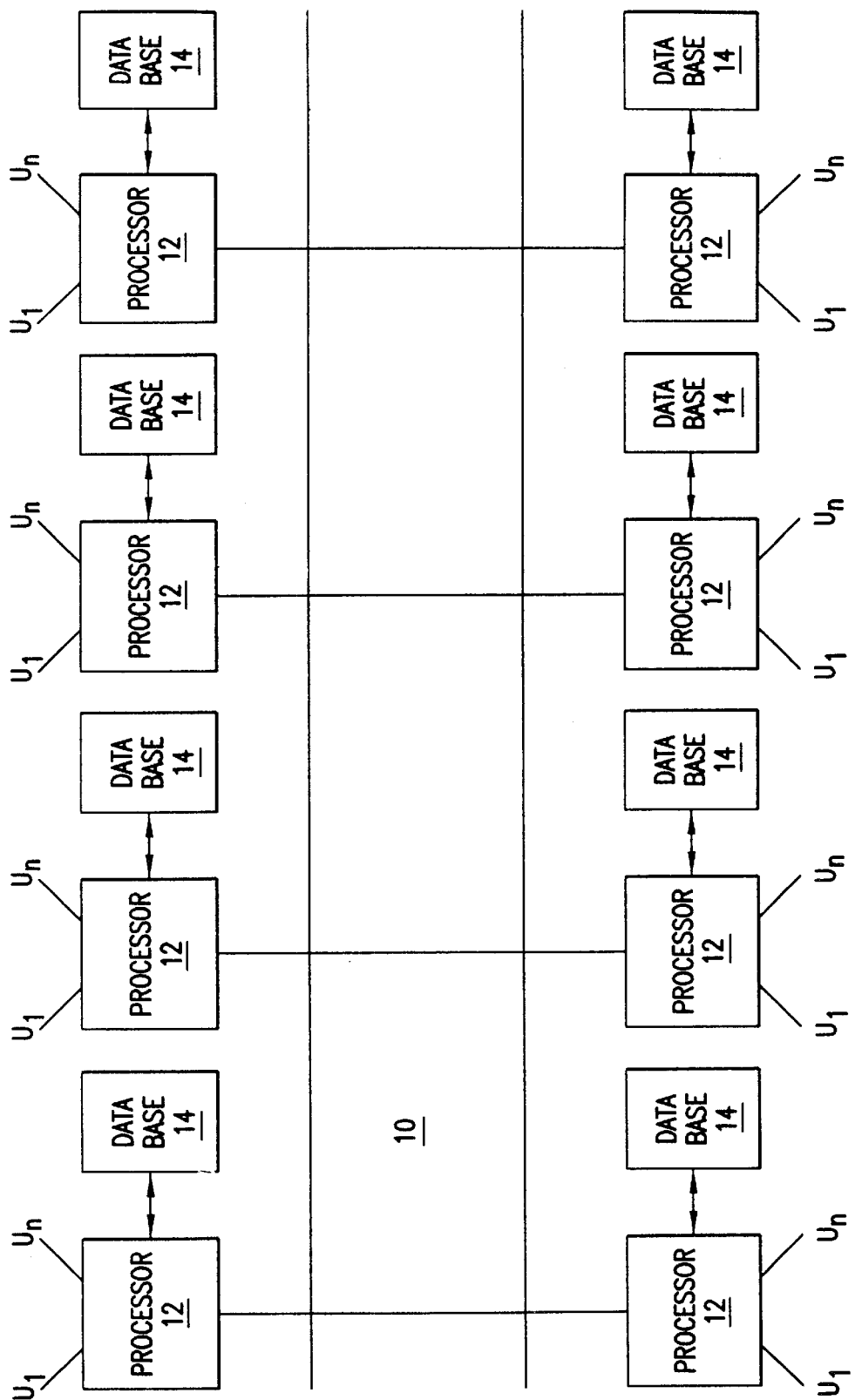
FIG. 1 is a representation of a prior art distributed information system which implements the principles of the present invention.

A distributed information system 10, e.g., the Internet to which the invention is applicable is shown in FIG. 1 The Internet is further described in the text "How The Internet Works" by Joshua Eddings, published by Ziff Davis, 1994. The system includes a plurality of processors 12 and related databases 14 coupled together through routers (not shown) for directing messages among the processors in accordance with network protocols. Each processor and related database is coupled to a plurality of users through servers (not shown). The users may originate messages for purposes of communication with other users and/ or search the system for information using search engines.

The initial research goal was to implement a WWW-based query—learning system in the system of FIG. 1 and support meaningful experimentation to provide a qualitative evaluation of the difficulty of the task.

To conduct this initial evaluation two different systems were implemented: one designed for batch use, and the other designed for interactive use, as will be described hereinafter.

A Batch System

The first implementation is a Perl script that runs as a "batch" system —it requires no user intervention. The input of the batch system is a list of Uniform Resource Locators (URL's) that correspond to the positive examples of an unknown concept. The batch system has two outputs: an intensional representation of the unknown concept, and a set of example documents that include all of the positive examples plus a sample of negative examples.

The procedure used to accomplish this is shown in FIG. 2. Three subroutines are used. The first, Learn comprehends a concept from a sample. The only assumption made by the query—learning system about the learning system is that the hypothesis of the learning system is in disjunctive normal form (DNF), where the primitive conditions test for the presence of words. For example, a DNF hypothesis learned from a resource list on college basketball might be:

(college basketball) V (college A hoops) V (NCAA A basketball)

Henceforth we will call each term (conjunction) in this DNF a "rule".

A set of k rules can be easily converted to k search queries, each of which consists of a conjunction of words —a query format that is supported by practically every search engine. The restriction, therefore, makes the system largely independent of the search engine used.

The second subroutine used by the query—learning system, Corresponding Query, converts a single rule to a query for the search engine being used. Some knowledge about the search engine is clearly needed to appropriately encode the query; however, because most search engines use similar formats for queries, adding the knowledge needed to support a new search engine is usually straightforward. Some search engines can handle more expressive queries —queries that require terms to appear near each other, or queries that contain word stems like "comput$*$". Most advanced queries are not currently supported by the existing Corresponding Query routine. One exception are queries containing conditions that check for the absence (rather than the presence) of words, such as (basketball NCAA). These can be used if both the learning system and the query system allow it, but were not used in any of the experiments of this invention.

The final subroutine,Top-k-Documents}, submits a query to a search engine and collects the top k documents returned. Again, some knowledge about the search engine is needed to perform this task.

The basic procedure followed by the batch query—learner is to repeatedly learn a set of rules, convert these rules to queries, and then use incorrect responses to these queries as negative examples. The premise behind this approach is that the responses to learned queries will be more useful than randomly selected documents in determining the boundary of the concept. Although this simple method works reasonably well, and can be easily implemented with existing search engines, we suspect that other strategies for collecting examples may be competitive or superior; for instance, promising results have been obtained with "uncertainty sampling. See Lewis and Gale (16) and query—learning by committee. See Seung et al (25). Also see Dagan and Engelson (10).

A few final details require some discussion.

Constraining the initial query: To construct the first query, a large set of documents were used as default negative examples. A "default negative example" is treated as a ordinary negative example unless it has already been labeled as positive example, in which case the example is ignored. We used 363 documents collected from a cache used by our labs' HTTP proxy server as default negative examples.

Termination: In the current implementation, the process of learning rules and then collecting negative examples is repeated until some resource limit set by the user is exceeded. Currently the user can limit the number of negative examples collected, and the number of times the learning system is called.

Avoiding looping: It may be that on a particular iteration, no new documents are collected. If this occurs, then the training data on the next iteration will be the same as the training data on the previous iteration, and the system will loop. To avoid this problem, if no new documents are collected on a cycle, heuristics are used to vary the parameters of the learning system for the next cycle. In the current implementation, two heuristics are followed: if the hypothesis of the learning system is an empty rule set, then the cost of a false negative is raised; otherwise, the cost of a false positive is raised. The proper application of these heuristics, of course, depends on the learning system being used.

An Interactive System

The batch system assumes that every document not on the resource list is a negative example. This means that it cannot be successfully used unless one is confident that the initial set of documents is reasonably complete. Our experience so far is that this is seldom the case. For this reason, we also implemented an interactive query—learning system, which does not assume completeness of an initial set of positive examples; instead, it relies on the user to provide appropriate labels.

The interactive system does not force any particular fixed sequence for collecting documents and labeling; instead it is simply an augmented WWW browser, which allows the user to label the document being browsed, to invoke the learning system, or to conduct a search using previously learned rules.

Figure 3:
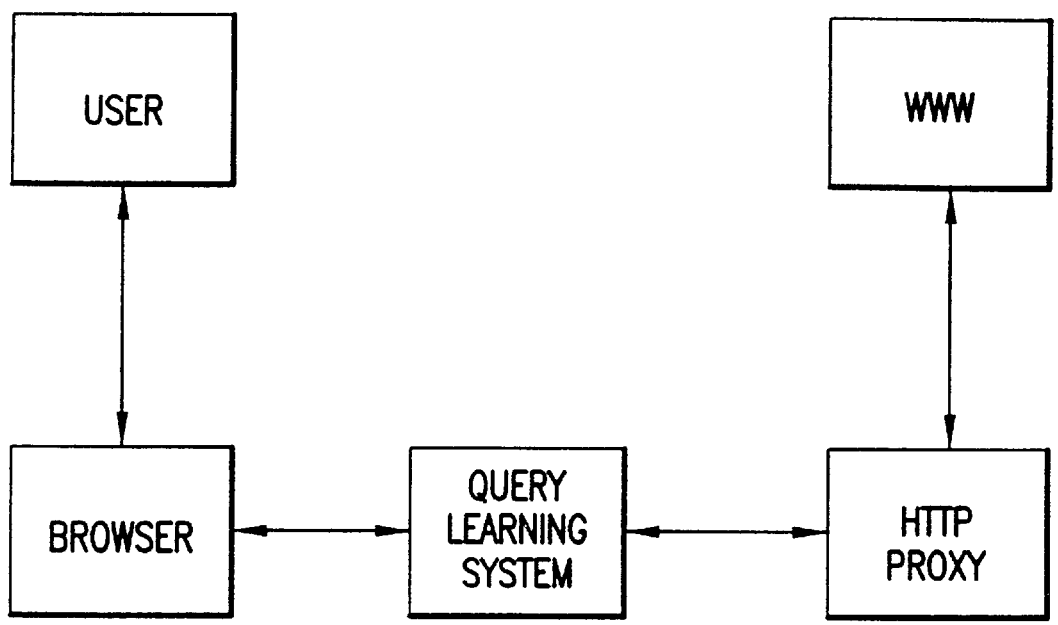
FIG. 3 is a representation of an interactive query— learning system incorporating the principles of the present invention.

The architecture of the interactive system is shown in FIG. 3. The user's interface to the query—learning system is implemented as a separate module that is interposed between a WWW browser and an HTTP proxy server. This module performs two main jobs. First, every HTML document that is transmitted from the proxy server to the browser is augmented, before being sent to the browser, by adding a small amount of text, and a small number of special links at the beginning of the document. Second, while most HTTP requests generated by the browser are passed along unmodified to the proxy server, the HTTP requests that are generated by clicking on the special inserted links are trapped out and treated specially.

This implementation has the advantage of being browser—independent. Following current practice, an acronym Surfing While Inducing Methods to Search for URLs or SWIMSUIT has been assigned to the system. The user's view of the query—learning system is a set of special links that appear at the top of each HTML page. Clicking on these links allows the user to perform operations such as classifying a document or invoking the learning system.

Figure 4:
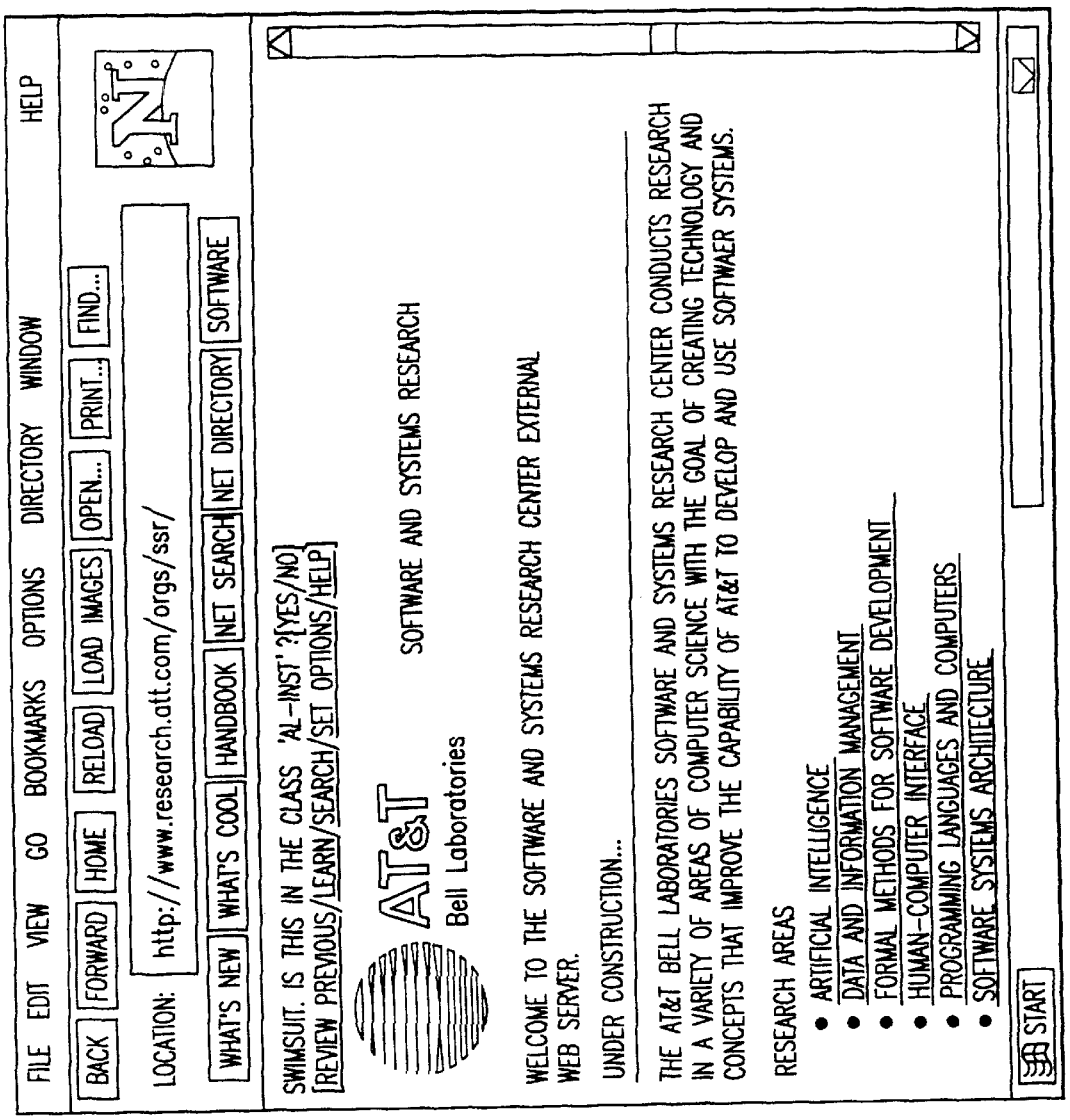
FIG. 4. is a user interface to the query learning system of the present invention.
Figure 8A:
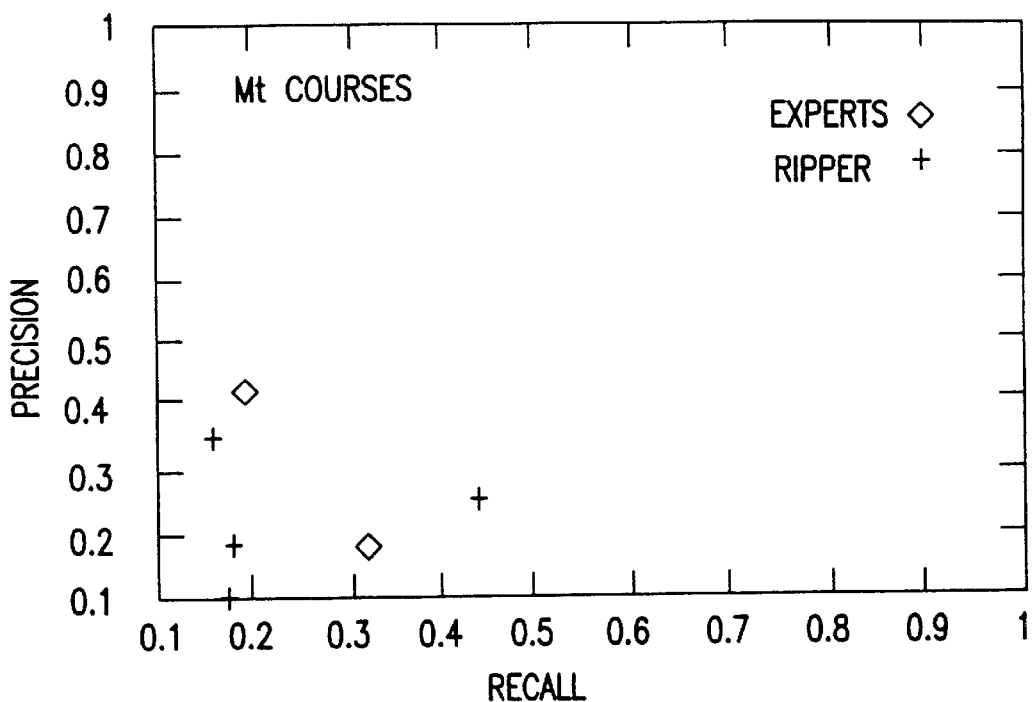
Figure 8B:
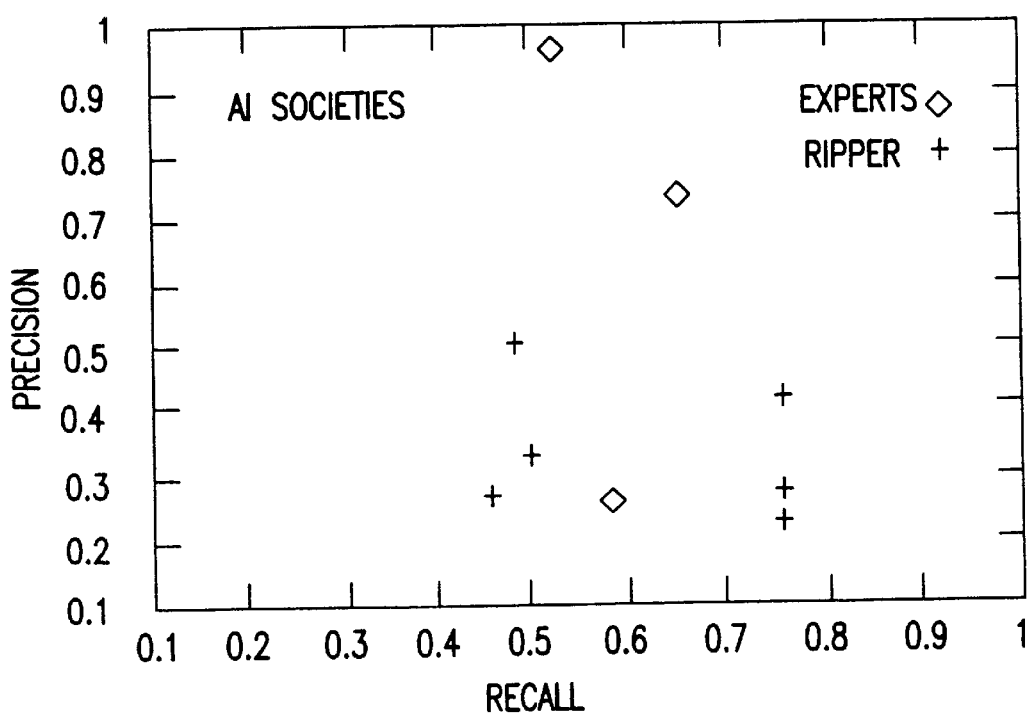
Figure 8C:
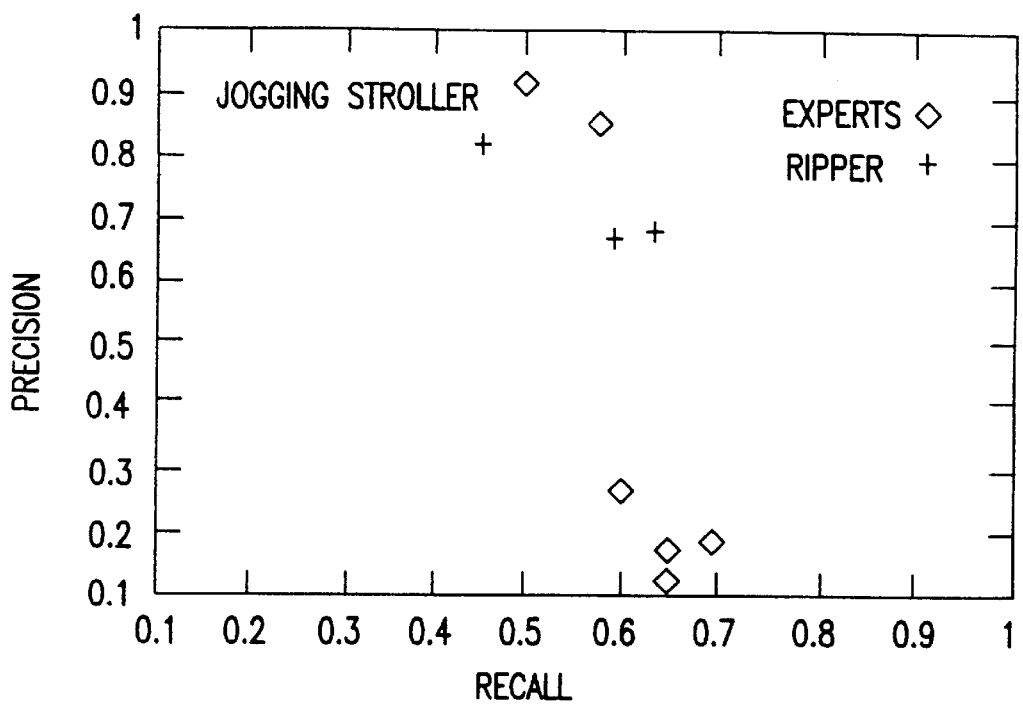
Figure 8D:
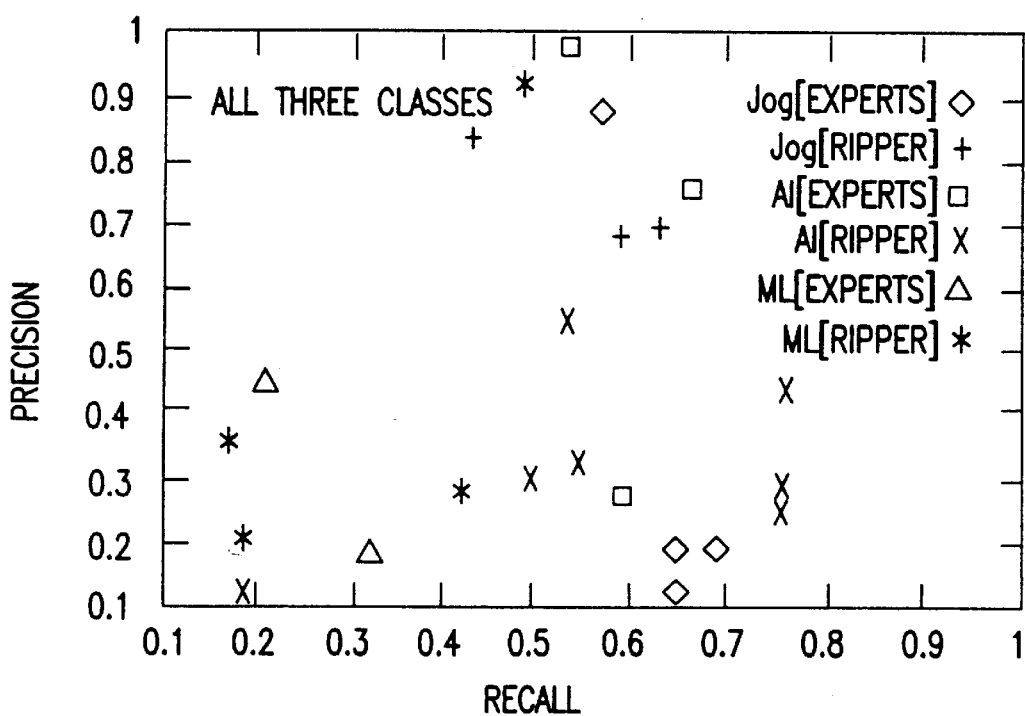

Functionally, the special links inserted by the query—learning interface act as additional "control buttons" for the browser —similar to the buttons labeled "Back" and "Net Search" on the Netscape browser. By clicking on special links, the user can classify pages, invoke the learning system, and so on. The user's view of the interactive system is shown in FIG. 4.

The special links are:

Document labeling: The yes link and no link allow the user to classify the current page as a positive (respectively negative) example of the current class.

Invoking the learner: The learn link returns a form that allows the user to set options for the actual learning system and/or invoke the learner on the current class. The behavior of this link can be easily changed, so that different learning systems can be used in experiments. As in the batch system, learning is normally constrained by using default negative examples. This means that reasonable rules can often be found even if only a few positive examples are marked.

Searching: The search link returns a list of previously learned rules. Clicking on any rule will submit the corresponding query to the currently selected search engine, and return the result.

Configuration and help: The set options link returns a form that allows the user to change the current class (or to name anew class), or to change the current search engine; the review previous link returns an HTML page that lists all previously marked examples of the current class; and the help link returns a help page.

Learning Systems

Two learning systems have been integrated with the system: RIPPER, a propositional rule learner that is related to FOIL, see Quinlan (21), and a rule—learning version of "Sleeping experts". Sleeping experts is a new prediction algorithm that combines ideas from used for online prediction, see Freund (11) with the infinite attribute model of Blum (3).

These algorithms have different strengths and weaknesses. RIPPER implicitly assumes that examples are i.i.d —which is not the case for samples collected via browsing or by the batch query—learning system. However, formal results suggest that sleeping experts will perform well even on data sets that are selected in a non-random manner. The sleeping experts algorithm is also largely incremental, which is potentially an advantage is this setting. On the other hand, sleeping experts uses a more restricted hypothesis space, and cannot learn large rules, whereas RIPPER can (at least in principle).

RIPPER

Briefly, RIPPER builds a set of rules by repeatedly adding rules to an empty ruleset until all positive examples are covered. Rules are formed by greedily adding conditions to the antecedent of a rule with an empty antecedent until no negative examples are covered. After a ruleset is constructed, a optimization postpass massages the ruleset so as to reduce its size and improve its fit to the training data. A combination of cross-validation and minimum-description length techniques are used to prevent overfitting. In previous experiments, RIPPER was shown to be comparable to C4.5rules, Quinlan (22) in terms of generalization accuracy, but much faster for large noisy datasets. For more detail, see Cohen (8).

The version of RIPPER used here was extended to handle "set—valued features", as described in Cohen (9). In this implementation of RIPPER, the value of a feature can be a set of symbols, rather than (say) a number or a single symbol. The primitive conditions that are allowed for a set—valued feature F are of the form $c \in F$, where c is any constant value that appears as a value of F in the dataset. This leads to a natural way of representing documents: a document is represented by a single feature, the value of which is the set of all tokens appearing in the document.. In the experiments, documents were tokenized by deleting e-mail addresses, HTML special characters, and HTML markup commands; converting punctuation to spaces; converting upper to lower case; removing words from a standard stoplist, Lewis (17) and finally treating every remaining sequence of alphanumeric characters as a token. To keep performance from being degraded by very large documents, we only used tokens from the first 100 lines of a file. This also approximates the behavior of some search engines, which typically index only the initial section of a document.

A second extension to RIPPER allows the user to specify a loss ratio, see Lewis and Catlett (14). A loss ratio indicates the ratio of the cost of a false negative error to the cost of a false positive error; the goal of learning is to minimize total misclassification cost, rather than simply the number of errors, on unseen data. Loss ratios in RIPPER are implemented by changing the weights given to false positive errors and false negative errors in the pruning and optimization stages of the learning algorithm.

One additional modification to RIPPER was also made specifically to improve performance on the query—learning task. The basic RIPPER algorithm is heavily biased toward producing simple, and hence general, conjunctions; for example, for RIPPER, when a conjunction of conditions is specific enough to cover no negative examples, no further conditions will be added. This bias appears to be inappropriate in learning queries, where the concepts to be learned are typically extremely specific. Thus, we added a postpass to RIPPER that adds to each of rule al 1 conditions that are true for every positive covered by the rule. Actually, the number of conditions added was limited to a constant k —in the experiments below, to k=20. Without this restriction, a rule that covers a group of documents that are nearly identical could be nearly as long as the documents themselves; many search engines do not gracefully handle very long queries. We note that a similar scheme has been investigated in the context of the "small disjunct problem", see Holte (14). The postpass implements a bias towards specific rules rather than general rules.

Sleeping Experts

In the past years there has been a growing interest in online prediction algorithms. The vast majority of the prediction algorithms are given a pool of fixed "experts"—each of which is a simple, fixed, classifier —and build a master algorithm, which combines the classifications of the experts in some manner. Typically, the master algorithm classifies an example by using a weighted combination of the predictions of the experts. Building a good master algorithms thus a matter of finding an appropriate weight for each of the experts. Formal results show that by using a multiplicative weight update, see Littlestone (18), the master algorithm is able to maintain a set of weights such that the predictions of the master algorithm are almost as good as the best expert in the pool, even for a sequence of prediction problems that is chosen by an adversary.

The sleeping experts algorithm is a procedure of this type. It is based on two recent advances in multiplicative update algorithms. The first is a weight allocation algorithm called Hedge, due to Freund and Schapire, see Freund (11), which is applicable to a broad class of learning problems and loss functions. The second is thenfinite attribute model of Blum (3) In this setting, there may be any number of experts, but only a few actually post predictions on any given example; the remainder are said to be "sleeping" on that example. A multiplicative update algorithm for the infinite attribute model (based on Winnow, Littlestone(19) has also been implemented, see Blum (4).

Below we summarize the sleeping experts procedure, which combines the Hedge algorithm with the infinite attribute model to efficiently maintain an arbitrarily large pool of experts with an arbitrary loss function.

The Master Algorithm

Pseudo-code for the algorithm is shown in FIG. 5. The master algorithm maintains a pool, which is a set recording which experts have been active on any previous example, and a set of weights, denoted by $\rho$, for every expert in the pool. At all times, all weights in $\rho$ will be non-negative. However, the weights need not sum to one. At each time step t, the learner is given a new instance $X_t$ to classify;the master algorithm is then given a set $W_t$ of integer indices, which represent the experts that are active (i.e., not "sleeping") on $X_t$. The prediction of expert i on $X_t$ is denoted by $$y_i^t$$

Based on the experts in $W_t$, the master algorithm must make a prediction for the class of $X_t$, and then update the pool and the weight set p.

To make a prediction, the master algorithm decides on a distribution $\bar{\rho}$ over the active experts, which is determined by restricting the set of weights $\rho$ to the set of active experts $W_t$, and normalizing the weights. We denote the vector of normalized weights by $\bar{\rho}$, $$\bar{p}_i^t = p_i^t / \sum_{j \in W_t} p_j^t;$$

The prediction of the master algorithm is $$F_\beta \left( \sum_{i \in W_t} \bar{p}_i^t y_i^t \right)$$

We use F (r)=1n(1−r+rβ)/(1n(1−r+rβ)+1n 1n((1−r)β+r)), the function used by Vovk (26) for predicting binary sequences.

Each active expert is the $t_i$ suffers some "loss"

In the implementation described here, this loss is 0 if the expert's prediction is correct and 1 otherwise.

Next, the master algorithm updates the weights of the active experts based on the losses. (The weight of the experts who are asleep remains the same, hence we implicitly set $$\forall i \notin W_t : P_i^{t+1}$$

).When an expert is first encountered its weight is initialized to 1. At each time step t, the master algorithm updates the weights of the active experts as follows, $$\forall i \in W_t : p_i^{t+1} = \frac{1}{Z} p_i^t U_\beta(l_i^t).$$

where Z is chosen such that $$\sum_{i \in W_t} p_i^t = \sum_{i \in W_t} p_i^{t+1}$$

The "update function" $U_S$ is any function satisfying [Cesa-Binachi et al., 5)$\beta^r \leq U_\beta(r) \leq 1-(1-\beta)r$. In our implementation, we used the linear update. $U_{62}$ (r)=1−(1−β)r, which is simple to implement and it avoids expensive exponentiations.

Briefly, if one defines the loss of the master algorithm to be the average loss with respect to the distribution $$(\bar{p}_i^t \mid i \in W_t).$$

the cumulative loss of the master algorithm over all t can be bounded relative to the loss suffered by the best possible fixed weight vector. These bounds hold for any sequence of examples $(x_1, y_1), \ldots, (x_t, y_t)$, in particular, the bounds hold for sequences whose instances are not statistically independent.

The Pool of Experts

It remains to describe the experts used for WWW page classification. In our experiments each expert is corresponds to a space that appears in a document. That is, if $\omega_t$ is the ith token appearing in the document, each expert is of the form $\omega_{i1} \omega_{i2} \ldots \omega_{ik}$ where $1 \leq i_1 < i_2 < \ldots i_{j-1}$ and $i_k - i_1 < n$. This is a generalization of the ngram/footnote model. Note that our goal is to classify WWW documents; hence each ngram expert is used to predict the classification of the document in which it appears, rather than the next token (word). For each ngram we construct two mini-experts, one which always predicts 0 (not in the class), and one that always predicts 1. The loss of each mini-expert is either % 0 or 1 depending on the actual classification of the document.

Extracting Rules From Experts

Finally, heuristics are used to construct rules based on the weights constructed by the sleeping experts algorithm. We constructed a rule for each expert predicts that 1 and that has a large weight. This is done by scanning the weights of the combined experts (each combined expert containing two mini-experts) and selecting those which have large weight. More formally, an expert i is used to construct a rule if $$p_i^T / \sum_{j \in} \text{Pool } P_j^T \geq w_{min},$$

where T is the number of training examples, and $w_{min}$ is a weight threshold for extracting experts. In practice, we have found that most of the weight is often concentrated on few experts, and hence the number of experts extracted is not too sensitive to particular choices of $w_{min}$. We used $w_{min}=0.0625$ and set the learning rate β to be 0.5 in the experiments described below.

Typically, the "heavy" experts correspond to phrases that frequently appear in documents labeled as positive examples; however, they may also appear in many of the negative labeled documents. We therefore examined the mini-experts of each extracted expert and selected those experts which are statistically correlated only with the positive examples. We define the average prediction $p_i$ of expert i, based on its two mini-experts (i,0) and (i, 1), to be $p_i = F_3(p_{i,0}/(p_{i,0}+p_{i,1}))$. An expert is finally chosen to be used as a rule if its average prediction is larger than $p_{min}$. In the experiments we used $p_{min}=0.95$ as the default value, and increased or decreased this threshold to encourage proportionally more or fewer positive predictions.

Finally, as was done with RIPPER, we add to each rule the list of all tokens that appear in all positive documents covered by a rule. We also remove all rules that have strictly fewer conditions than another rule in the set. The result is a rule set where each rule is of the form $w_{i1} \Lambda W_{i2} \Lambda \ldots \Lambda W_{ik}$.

Although the sleeping experts algorithm treats this as an ngram, we currently treat it simply as a conjunction of features: clearly, this is suboptimal for search engines which support proximity queries.

Experimental Results

We have evaluated the system with three resource directories.

ML courses is part of an excellent machine learning resource maintained by David Aha[1]. This list contained (at the time the experiments were conducted) pointers to 15 on-line descriptions of courses.

AI societies is a WWW page jointly maintained by SIGART, IJCAI, and CSCSI. It contains pointers to nine AI societies.

Jogging strollers. This is a list of pointers to discussions of, evaluations of, and advertisements for jogging and racing strollers.

Our initial goal was to find resource directories that were exhaustive (or nearly so) containing virtually all positive examples of some narrow category. Our hope was that systematic experiments could then be carried out easily with the batch system. However, finding such a resource turned out to be much harder than we expected.

We began with the MLcourse problem, which as a narrow section of a frequently—used resource we expected to be comprehensive; however, preliminary experiments showed that it was not. (The first query constructed by the batch system using RIPPER etrieved (from Altavista) 17 machine learning course descriptions in the first 20 documents; however, only 5 of these were from the original list.). For those interested in details, this query was (course $wedge$ machine $wedge$ instructor $wedge$ learning)

Our next try at finding a comprehmachine learning course descriptions in the first 20 documents; ensive resource directory was the AI societies problem; this directory had the advantage (not shared by the ML course directory) that it explicitly stated a goal of being complete. However, similar experiments showed it to be quite incomplete. We then made an effort to construct a comprehensive list with the jogging strollers problem. This effort was again unsuccessful, in spite of spending about two hours with existing browsers and search engines on a topic deliberately chosen to be rather narrow.

We thus adopted the following strategy. With each problem we began by using the interactive system to expand an initial resource list. After the list was expanded, we invoked the batch system to collect additional negative examples and thus improve the learned rules.

Experiments With The Interactive system

We used the interactive system primarily to emulate the batch system; the difference, of course, being that positive and negative labels were assigned to new documents by hand, rather than assuming all documents not in the original directory are negative. In particular, we did not attempt to uncover any more documents by browsing, or hand-constructed searches. However, we occasionally departed from the script by varying the parameters of the learning system (in particular, the loss ratio), changing search engines, or examining varying numbers of documents returned by the search engines. We repeated the cycle of learning, searching, and labeling the results, until we were fairly sure that no new positive examples would be discovered by this procedure.

FIG. 6 summarizes our usage of the interactive system. We show the number of entries in each initial directory, the term Recal is the fraction of the time that an actual positive example is predicted to be positive by the classifier, and the term precision is the fraction of the time that an example predicted to be positive is actually positive. For convenience, we will define the precision of a classifier that always prefers the class negative as 1.00 of the initial directory relative to the final list that was generated, as well as the number of times a learner was invoked, the number of searches conducted, and the total number of pages labeled. We count submitting a query for each rule as a single search, and do not count the time required to label the initial positive examples. Also, we typically did not attempt to label every negative example encountered in the search.

To summarize, the interactive system appears to be very useful in the task of locating additional relevant documents from a specific class; in each case the number of known relevant documents was at least quadrupled. The effort involved was modest: our use of the interactive system generally involved labeling a few dozen pages, waiting for the results a handful of searches, and invoking the learner a handful of times. In these experiments the time required by the learner is typically well under 30 seconds on a Sun 20/60.

Experiments With The Batch System

In the next round of experiments, we invoked the batch system for each of these problems. FIG. 7 shows the resource limit set for each of these problems (the column "/#Iterations Allowed" indicates how many times the learning system could be called), the number of documents k that were collected for each query, and the total number of documents collected by the batch system (not including the initial set of 363 default negative examples). The resource limits used do not reflect any systematic attempt to find optimal limits. However, for the last two problems, the learner seemed to "converge" after a few iterations, and output a single hypothesis (or in one case alternate between two variants of a hypothesis) on all subsequent iterations.} In each case, RIPPER was used as the learning system.

We then carried out a number of other experiments using the datasets collected by the batch system. One goal was simply to measure how successful the learning systems are in constructing an accurate intensional definition of the resource directories. To do this we re-ran the learning systems on the datasets constructed by the batch system, executed the corresponding queries, and recorded the recall and precision of these queries relative to the resource directory used in training. To obtain an idea of the tradeoffs that are possible, we varied the number of documents k retrieved from a query and parameters of the learning systems (for RIPPER, the loss ratio, and for sleeping experts, the threshold $\rho_{min}$.) Altavista was used as the search engine.

The results of this experiment are shown in the graphs of Fig. 8. The first three graphs show the results for the individual classes and the second graph shows the results for all three classes together. Generally, sleeping experts generates the best high-precision classifiers. However, its rulesets are almost always larger than those produced by RIPPER; occasionally they are much larger. This makes them more expensive to use in searching and is the primary reason that RIPPER was used in the experiments with the batch and interactive systems.

The constructed rulesets are far from perfect, but this is to be expected. One difficulty is that the neither of the learners perfectly fit the training data; another is that the search engine itself is incomplete. However, it seems quite likely that even this level of performance is enough to be useful. It is instructive to compare these hypotheses to the original resource directories that were used as input for the interactive system. The original directories all have perfect precision, but relatively poor recall. For the jogging strollers problem, both the learners are able to obtain nearly twice the recall (48% vs 25%) at 91% precision. For the AI societes problem, both learners obtain more than three times the recall at 94% precision or better. (RIPPER obtains 57% vs 15% recall with 94% precision.

We also conducted a generalization error experiment on the datasets. In each trial, a random 80% of the dataset was used for training and the remainder for testing. A total of 50 trials were run for each dataset, and the average error rate, precision and recall on the test set (using the default parameters of the learners) were recorded.

The results are shown in FIG. 9. However, since the original sample is non-random, these numbers should be interpreted with great caution. Although the results suggest that significant generalization is taking place, they do not demonstrate that the learned queries can fulfill their true goal of facilitating maintenance by alerting the maintainer to new examples of a concept. This would require a study spanning a reasonable period of time.

Summary

The World Wide Web (WWW) is currently filled with resource directories —documents that collect together links to all known documents on a specific topic. Keeping resource directories up-to-date is difficult because of the rapid growth in on-line documents. This invention describes the use of machine learning methods as an aid in maintaining resource directories. A resource directory is treated as an exhaustive list of all positive examples of an unknown concept, thus yielding an extensional definition of the concept. Machine learning methods can then be used to construct from these examples an intensional definition of the concept. The learned definition is in DNF form, where the primitive conditions test the presence (or even the absence) of particular words. This representation can be easily converted to a series of queries that can be used to search for the original documents —as well as new, similar documents that have been added recently to the WWW.

Two systems were implemented to test these ideas, both of which make minimal assumptions about the search engine. One is a batch system which repeatedly learns a concept, generates an appropriate set search queries, and uses the queries to collect more negative examples. An advantage of this procedure is that it can collect hundreds of examples with no human intervention; however, it can only be used if the initial resource list is complete (or nearly so). The second is an interactive system. This systems augments an arbitrary WWW browser with the ability to label WWW documents and then learn search—engine queries from the labeled documents. It can be used to perform the same sorts of sequences of actions as the batch system, but is far more flexible. In particular, keeping a human user "in the loop" means that positive examples not on the original resource list can be detected. These examples can be added to the resource list both extending the list and improving the quality of the dataset used for learning. In experiments, these systems produce usefully accurate intensional descriptions of concepts. In two of three test problems, the concepts produced had substantially higher recall than manually—constructed lists, while attaining precision of greater than 90%.

In support of the invention, and in particular the description of Preferred Embodiment, the following Appendices are included in the application:

Appendix 1. A list of references cited in the application by reference numeral.

Appendix 2. A copy of a README file which describes the source code implementing the presently—preferred embodiment of the invention.

Appendix 3. Commented source code written in perl for the presently—preferred embodiment of the invention.

This is a computer program listing appendix, submitted on a CD and incorporated by reference in its entirety.

Appendix 4. A copy of the documentation for the OreO shell tool which was used in the implementation of the presently—preferred embodiment.

COHEN 6-1

Appendix 2. A copy of a README file which describes the source code implementing the presently-preferred embodiment of the invention.

APPENDIX 2

README Page 1

=============================================================== utilities

=============================================================== oreo.pl

- some utilities for handling http requests with oreosh

=============================================================== general routines for use with oreosh my hope is that these can be used for other purposes as.well....

===============================================================

27036 v1 connect.pl

- simple two-way connection using oreosh.

mostly there as an example.

trap-request.pl

- traps http requests that match a given regexp and handles the specially-specifically a given program is invoked and its output (which should be html) is returned to the client.

markup.pl

- allows you to insert arbitrary stuff at the top of html documents, before the client gets a hold of them.

cache.pl, cache-util.pl

- implements a simple local cache for html pages track.pl

- buggy routine to track state of the.browser

=========================================================== the form-labeling program

=========================================================== launch.csh

- invokes this cascade of creosh creatures client I trap-request I markup I cache I proxy The client should connect to port 8111 of radish.

autosurf.pl

- loads in cache and cycles through it randomly, filtering by the current class definition.

ss-marker.pl

- invoked by the markup.pl daemon, this inserts an appropriate header into html documents ss-main.pl

- this traps the requests included in ss-marker.pl and handles them specially. The request handling is done in the files below. All local data is stored in -user/.ss/cache -or -user/.ss/data.

COHEN 6-1

Appendix 3. Commented source code written in perl for
the presently-preferred embodiment of the invention.

COHEN 6-1

Appendix 4. A copy of the documentation for the Oreo shell tool which was used in the implementation of the presently-preferred embodiment.

APPENDIX 4

Developing an OreO Agent

Table of Contents

- Types of OreO Agents
- Library Routines
- OreO Shell API
- Future Directions

OreO Agents

By some measurements, OreO agents appear to function as servers in that they support connections from multiple clients and provide services to these clients. In this respect, the design of an OreO Agent (agent) uses the same techniques as designing any other network-based server.

We define a connection as consisting of two socket; one to the "upstream" client and one to the "downstream" server. The OreO shell (oreosh) is responsible for setting up these connections and making them available to the actual processing code. An OreO agent is thus a combination of the OreO shell and some processing code: in the simplest case, a plain OreO shell acts as a simple pass-thru mechanism. The agent receives HTTP request data on the client socket, and HTTP response data on the server socket.

OreO Agents expect to see HTTP proxy requests. The HTTP proxy protocol simply specifies that URLs presented in the various HTTP methods will be absolute; normally, an HTTP server don't see the scheme and host address/port number portion of the URL. These proxy requests are then forwarded to the host specified by the OREO PROXY environment variable (specified as a <hostaddress>":"<Port number>tuple).

Since the agent "speaks" the HTTP proxy protocol on both its upstream and downstream side, OreO agents may be nested in a manner similar to Unix pipelines.

When designing an agent, we can utilize several different designs. These
- are whether connection should be processes serially or in parallel
- whether an new process is generated for each connection.

The above results in four different agent models, which we discuss below. Our use of them process is influenced by the canonical Posix process model, which supports (at present) a single thread of control per process. The design of an agent will change dramatically for those systems (like Windows/NT) that provide multiple threads of control per process.

Serial connections, multiple processes

In this model, a new process is generated for each connection and the shell waits for this process to finish before accept( ) ing another connection. This model is useful when the agent code requires sequential access to a shared resource, and no mechanism exists to synchronize shared access to that resource. This form of processing is enabled by specifying the -1 switch to the OreO shell.

Parallel connection, multiple process

In this model, the shell guarantees a new process for each connection, but the shell immediately returns to accept another incoming connection. This provides maximum parallelism, but not necessarily optimum thruput. The application must synchronize access to shared, writeable resources such as databases, files, etc.

In both instances, the shell supports different ways to process the HTTP request and response. The agent author can choose to filter either the HTTP request, the HTTP response, or both. If only the request or response stream is desired, the shell takes responsibility for forwarding the other.

The shell supports this via the following command line arguments.

- i    process the HTTP request stream
- o    process the HTTP response stream
- b    process the request and response stream If no arguments are specified, the OreO shell simply copies its input and output from the client to the server, and vice versa.

When filtering the request stream, the shell arranges to connect the client socket to the standard input (stdin) of the child process, and the server socket to the standard output (stdout). This is reversed for processing the response stream.
Connecting the sockets in this way permits the use of pre-existing Unix style filters as processing code, or creating processing code in various script languages that easily read and write stdin and stdout.

Processes that read from the client side normally will never see EOF, since the client is waiting on that channel to receive the HTTP response. Therefore, the shell intervenes on the process's behalf, and sends a SIGTERM when EOF is seen on the HTTP response stream. Processes that read the response stream will see EOF when the server closes the connection; at this point, the socket to the client can be closed after the data has been written.

If only one of -i or -o are specified, the shell takes responsibility for processing the other side of the connection.

Single process for all connections, serial processing

In this model, a single process (the co- process) is generated by the shell upon startup; the shell still generates the connections, but passes these connections to the co-process via an IPC mechanism. The shell does not wait for the IPC to be acknowledged, but rather passes an identifier that uniquely identifies the particular pair of sockets corresponding to this connection. Once the co-process has taken control of these connections, the co-process acknowledges this to the shell, and the shell closes its copy of the sockets (this is necessary since the client side will never see an EOF on its socket if multiple processes have this connection open).

Single process for all connections; parallel processing

This implementation works exactly as described above under the serial processing case, but the co-process manipulates each connection in parallel instead of sequentially. Note that it is the responsibility of the co-process to implement sequential vs. parallel processing; the shell is always asynchronous with respect to transferring connections to the co-process.

Library Routines

This version of the Oreo shell packages several functions into a library into a library (liboreo.a). These routines are used both by the OreO shell and by the OreO Shell API functions. These routines are documented here as an aid to those who wish to program OreO agents at a low level interface.

typedef int Socket;

int makeArgv(char * string, char * av[], int maxargs)

Takes as input a text string, and returns a vector of pointers that no point to individuals tokens in that string (where a token is defined to be a series of non-white-space characters separated by a series of white-space characters. White-space characters are spaces and tabs. Returns the number of tokens, which will be <= the max number of strings allowed. The caller must allocate space for the vector of pointers.

int readn(Socket s, void * buffer, unsigned int size)

Like read ( ), but guarantees that size bytes are read before returning.

int written(Socket, void * buffer, unsigned int size)

Like write( ), but guarantees the specified number of bytes will be written before the call returns. This is important because of protocol buffering and flow control, since it is very possible that the write ( ) call will return less than number of bytes requested.

int RecvRights ( Socket IPSock, Socket * client, Socket * server)

This call returns a socket corresponding to connections to the client and downstream server. This call hides the mechanisms used to retrieve these sockets; such mechanisms are guaranteed to be different across operator systems, and may change from release to release.

Signal Handling

Agent writers should not have to worry about signal handling; in fact, a correct implementation relies on the default signal handling behavior as specified by the POSIX signal handling mechanisms.

OreO Shell API

In order to facilitate the creation of Oreo agents, we have defined a higher-level API than that presented by the Winsock API. We call this the Oreo shell API. This API presents the notion of a connection that can be created and deleted. Each connection contains our two Sockets, and a variable indicating the state of the connection; uninitialized, processing the request, processing the response, or terminating. This API either supports agents written using the co-process model, or agents that receive their sockets on stdin or stdout.

The following example is a rudimentary example of using the Shell API to implement an agent that could be invoked via the -b switch.

```
ConnectionPtr cp = newOSHConnection(StdioConnection);
    // process the request
    while (nn = OSHConnectionRead(cp->browser, buffer,
                                  sizeof buffer) > 0)
        (void) OSFConnectionWrite ( cp->proxy, buffer, n);
    while (nn = OSHConnectionRead( cp->proxy, buffer,
                                   sizeof buffer) > 0
```

```
OSFConnectionWrite( cp->client, buffer,n);
deleteOSHConnection(&cp);
```

This named code would be suitable for generating a program to be used as a co-process; in this case, the *connection would* be created by a call to newOSHConnection( IPConnection )

Future Directions

This is the first version of a UNIX (POSIX) release. Future releases will buffer in implementation details; however, the interfaces defined above will not change, nor will the implementation defined by the OreO Shell API.

One notion is to re-implement the OreO shell as an agent analogue of the internet inetd. In this version, the shell would initialize via a configuration mechanism that would indicate a specific port number, a process to run, and how that process should be started. The shell would accept connections on all such port numbers, and generate the appropriate sequence of commands to start the appropriate agents.I An alternative would be to re-implement the shell as a "location broker" for agents, in the style of the DEC RPC daemon. Processes would connect to the Agent daemon, and request services; if available, the daemon would redirect these requests to the appropriate agent. This would probably require a change to the HTTP proxy protocol model.

While the invention has been shown and described with respect to preferred imbodiments, various modifications can be made therein without departing from the spirit and scope of the invention, as described in the specification and defined in the claims, as follows:

We claim:

1. A method of adding new documents to a resource list of existing documents, executable in a computer system, comprising the steps of:

learning a rule for which the documents on the resource list are positive examples of a class of selection information which selects the documents on the resource list;

making a persistent association between the selection information and the resource list;

using the selection information independent for a meta search engine to identify data on a plurality of items characterized as positive and/or negative examples of the class of information to select a set of documents which the information specifies; and adding new documents to the resource list, the new documents being added belonging to a subset of the selected set of documents which contains documents which are not already on the resource list.

2. The method set forth in claim 1 wherein the step of adding documents comprises the steps of:

interactively determining whether a document in the subset should be added to the resource list; and adding the document only if it has been determined that the document should be added.

3. The method set forth in claim 2 further comprising the steps of:

using a document for which it has been determined that the document should not be added together with documents on the resource list to learn new selection information; and associating the new selection information with the resource list.

4. The method set forth in claim 1 wherein the step of learning the selection information comprises the steps of:

learning a rule for which the documents on the resource list are positive examples;

translating the rule into a query; and in the step of using the selection information, using the query to select the set of documents.

5. The method set forth in any of claims 1 through 4 wherein:

the system in which the method is practiced has access to a plurality of searching means;

the step of learning the selection information learns a plurality of queries as required by the plurality of searching means; and the step of using the selection information to select a set of documents uses the plurality of queries in the plurality of searching means.

6. The method set forth in claim 5 wherein: the system in which the method is practiced has access to the world wide web; and the searching means are searching means in the world wide web.

7. An improved web page of a type which contains a list of documents, the improvement comprising:

a machine learning system for learning a rule for which the documents on the web page are positive examples of a class of selection information which selects the documents on the web page;

a meta search engine using selection information to identify data on a plurality of items characterized as positive and/or negative examples of a class of information associated with the web page which selects documents having content which is similar to the documents on the list, whereby the list of documents on the web page is updated using the selection information.

8. In a computer system, apparatus, for making a resource list of documents which have contents belonging to the same class, the apparatus comprising:

a first list of documents, all of which have contents as positive examples belonging to the class;

a second list of documents, none of which have contents as negative examples belonging to the class;

learning means responsive to the first list of documents and the second list of documents for learning a rule for which the documents on the resource list arc positive examples of the class of selection information which specifies documents whose contents belong to the class;

meta search means responsive to the selection information for finding the documents whose contents belong to the class, using the documents to make the resource list, and making a persistent association between the selection information and the resource list.

9. The apparatus set forth in claim 8 further comprising:

first interactive means for indicating whether a given document is to be added to the first list or the second list.

10. The apparatus set forth in claim 9 further comprising:

second interactive means for activating the learning means.

11. The apparatus set forth in claim 10 further comprising:

third interactive means for activating the means for finding the documents.

12. The apparatus set forth in any of claims 9 through 11 wherein:

the apparatus is used in a system which includes a document browser; and the interactive means of the claim are implemented in the document browser.

13. In an information system which stores related data and information as items for a plurality of interconnected computers accessible by a plurality of users, a method for finding items of a particular class residing in the information system comprising the steps of:

a) identifying as training data a plurality of items characterized as positive and/or negative examples of the class;

b) using a learning technique to generate from the training data at least one query that can be submitted to any of a plurality of methods for searching the information system;

c) submitting said query to meta search means and collecting any new item(s) as a response to the query;

d) evaluating the new item(s) by a learned model with the aim of verifying that the new item(s) is indeed a new subset of the particular class; and e) presenting the new subset of the new item(s) to a user of the system.

14. The method of claim 13 wherein the information system is a distributed information system (DIS) and the items are documents collected in resource directories in the DIS.

15. The method of claim 14 wherein step a) the positive examples are a set of documents in the resource directories and the negative examples are a selection of documents obtained by using the process of steps a–d.

16. The method of claim 15 wherein step b) the query is (i) a conjunction of terms which must appear in a document as a positive example; (ii) contains all the terms appearing in the training data covered by the query, and (iii) learned by the system using a propositional rule—learning or prediction algorithm method.

17. The method of claim 16 wherein step d) a learning technique generates from the training data a learned model that computes a score for the new item(s), such that the new item(s) which has a low probability of being classified within the particular class.

18. The method of claim 17 further comprising the step of providing a user on the system an ordered list of the new item(s) according to the score assigned by the learned model.

19. The method of claim 17 further comprising the step of providing a user by electronic mail or facsimile an ordered list of the new item(s) having a score exceeding a threshold probability.

20. The method of claim 17 further comprising the step of using an batch process to identify documents as positive or negative examples of the search concept.

21. The method of claim 17 further comprising the step of using an interactive process to identify documents as positive examples of the search concept by browsing the distributed information system.

22. The method of claim 17 further comprising the step of resubmitting a query to the system to detect any new item added to the system and related to the query.

23. An information system which stores related data and information as items for a plurality of interconnected computers accessible by a plurality of users for finding items of a particular class residing in the information system using query learning and meta search, comprising:
 a) means for identifying as training data in the system a plurality of items characterized as positive and/or negative examples of the class;
 b) means for using a learning technique to generate from the training data at least one query that can be submitted to any of a plurality of search engines for searching the information system;
 c) means for submitting said query to a meta search engine and collecting any new item(s) as a response to the query;
 d) means for evaluating the new item(s) by the at least one search engine with the aim of verifying that the new item(s) is indeed a new subset of the particular class; and
 e) means for presenting the new subset of the new item(s) to a user of the system.

24. The system of claim 23 wherein the information system is a distributed information system (DIS) and the items are documents stored in resource directories in the DIS.

25. The system of claim 24 wherein the positive examples are a set of items in the resource directories and the negative examples are a selection of documents obtained by the search engine in responding to the query.

26. The system of claim 25 the query is (i) a conjunction of terms which must appear in a document as a positive example; (ii) contains all the terms appearing in the training data covered by the query, and iii) learned by the system using a propositional rule—learning or prediction algorithm method.

27. The system of claim 26 wherein step the learning technique generates from the training data a learned model that computes a score for the new item(s), such that the new item(s) which has a high probability of being classified within the particular class will be assigned a higher score than the new item(s) which has a low probability of being classified within the particular class.

28. The system of claim 27 further comprising means for providing a user on the system an ordered list of the new item(s) according to the score assigned by the learned model.

29. The system of claim 27 further comprising means for providing a user by electronic mail or facsimile an ordered list of the new item(s) having a score exceeding a threshold probability.

30. The system of claim 27 further comprising means for using a batch process to select documents as positive examples of the search concept.

31. The system of claim 27 further comprising means for using an interactive process to identify documents as positive examples of the query by browsing the distributed information system.

32. The system of claim 27 further comprising means for resubmitting a query to the system to detect any new item added to the system and related to the query.

33. An article of manufacture comprising:
 a computer useable medium having computer readable program code means embodied therein for finding items of a particular class residing an information system which stored related data and information as items for a plurality of interconnected computers accessible by a plurality of users, the computer readable program code means in said article of manufacture comprising:
 a) program code means for identifying as training data a plurality of items characterized as positive and/or negative examples of the class;
 b) program code means for using a learning technique to generate from the training data at least one query that can be submitted to any of a plurality of methods for searching the information system;
 c) program code means for submitting said query to meta search means and collecting any new item(s) as a response to the query;
 d) program code means for evaluating the new item(s) by meta search means with the aim of verifying that the new item(s) is indeed a new subset of the particular class; and
 e) program code means for presenting the new subset of new item(s) to a user of the system.

* * * * *

UNITED STATES PATENT AND TRADEMARK OFFICE
CERTIFICATE OF CORRECTION

PATENT NO.    : 6,418,432 B1
DATED         : July 9, 2002
INVENTOR(S)   : Cohen et al.

It is certified that error appears in the above-identified patent and that said Letters Patent is hereby corrected as shown below:

<u>Title page,</u>
Item [56], OTHER PUBLICATIONS, please add the following citations:

-- Chidanand Apté, Fred Damerau, and Sholom M. Weiss. "Automated learning of decision rules for text categorization." ACM Transactions on Information Systems. 12(3):233-251, 1994.
M. Pazzani, L. Nguyen, and S. Mantik., "Learning from hotlists and coldlists: towards a WWW information filtering and seeking agent." In *Proceedings of AI Tools Conference.* Washington, DC, 1995.
G. Salton, C. Buckley, and E.A. Fox., "Automatic query formulations in information retrieval." Journal of the American Society for Information Science, 34(4):262-280, 1983.
G. Salton, E.A., Fox, and E. Voorhees, "Advances feedback methods in information retrieval." Journal of the American Society for Information Science, 36(3):200-210, 1985.
Erik Selbert & Oren Etzioni, "Multi-Service Search and Comparison Using the MetaCrawler", Dept. of Computer Science & Engineering, University of Washington, Seattle, WA (10/09/95), pp. 1-18.
Michael Pazzani, et al., "Syskill & Webert: Identifying interesting web sites", Dept. of Information & Computer Science, University of California, Irvine, Irvine, CA , 10 pp.                                          --

Signed and Sealed this

Twenty-ninth Day of July, 2003

JAMES E. ROGAN
*Director of the United States Patent and Trademark Office*